United States Patent [19]

Wisnewski et al.

[11] 3,822,531
[45] July 9, 1974

[54] DEVICE FOR AGGLOMERATING AND SEPARATING PARTICULATES FROM A GAS

[75] Inventors: John P. Wisnewski, Corpus Christi; Martin B. Treuhaft, San Antonio, both of Tex.

[73] Assignee: PPG Industries, Inc., Pittsburgh, Pa.

[22] Filed: Feb. 27, 1973

[21] Appl. No.: 336,318

[52] U.S. Cl............ 55/315, 55/342, 55/424, 55/459, 55/524, 55/525, 55/527, 55/DIG. 16, 55/DIG. 25, 55/DIG. 30, 60/311
[51] Int. Cl............................ B01d 50/00
[58] Field of Search...... 55/DIG. 30, 276, 319, 322, 55/332, 337, 459, 498, 524; 23/288 F; 60/297, 311; 161/154

[56] References Cited
UNITED STATES PATENTS

| | | | |
|---|---|---|---|
| 2,919,211 | 12/1959 | Labino | 55/524 X |
| 3,105,752 | 10/1963 | Bruce | 23/288 F UX |
| 3,147,097 | 9/1964 | Aguas | 55/DIG. 30 |
| 3,397,034 | 8/1968 | Tulleners et al. | 55/DIG. 30 |
| 3,485,593 | 12/1969 | Lenane et al. | 55/DIG. 30 |
| 3,505,794 | 4/1970 | Nutter et al. | 55/498 X |
| 3,564,843 | 2/1971 | Hirschler, Jr. et al. | 55/DIG. 30 |
| 3,631,654 | 1/1972 | Riely et al. | 55/524 X |
| 3,680,659 | 8/1972 | Kasten | 55/276 UX |
| 3,712,029 | 1/1973 | Charlton | 55/276 X |
| 3,713,962 | 1/1973 | Ackley | 161/154 |
| 3,738,089 | 6/1973 | Brill | 55/319 X |

Primary Examiner—Dennis E. Talbert, Jr.
Assistant Examiner—Kathleen Prunner
Attorney, Agent, or Firm—Irwin M. Stein

[57] ABSTRACT

An apparatus is described for conditioning gaseous emissions from an internal combustion engine, e.g., an automobile engine, said emissions containing particulate matter, e.g., lead and other particulates, said apparatus comprising an agglomerator coupled to an inertial separator in a housing and which apparatus is preferably coupled to a filter.

12 Claims, 6 Drawing Figures

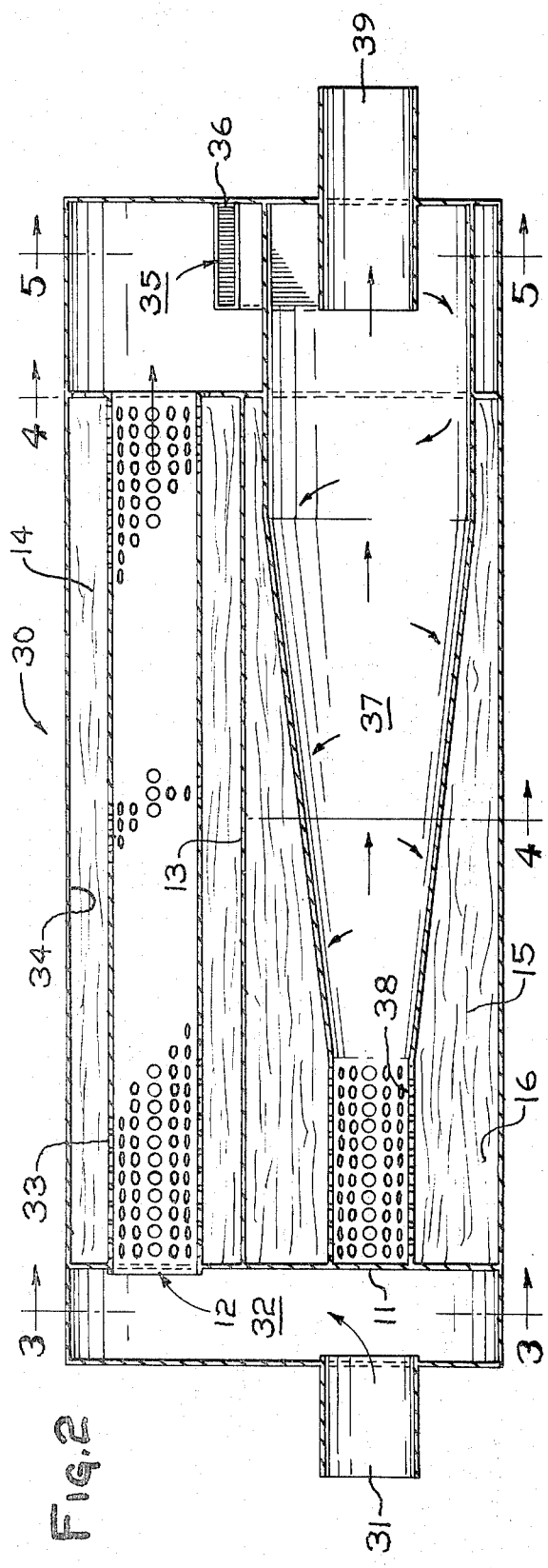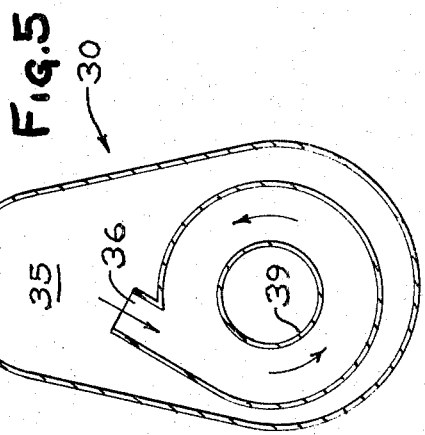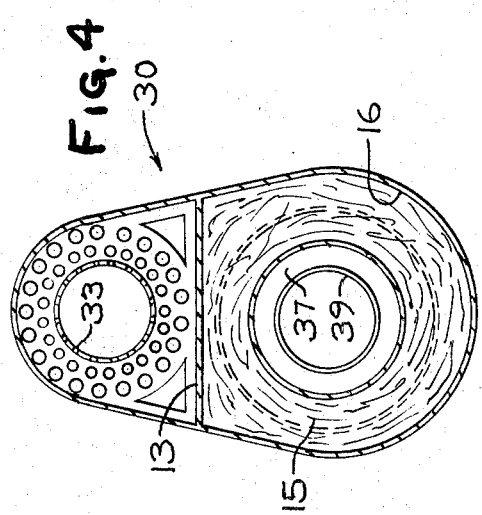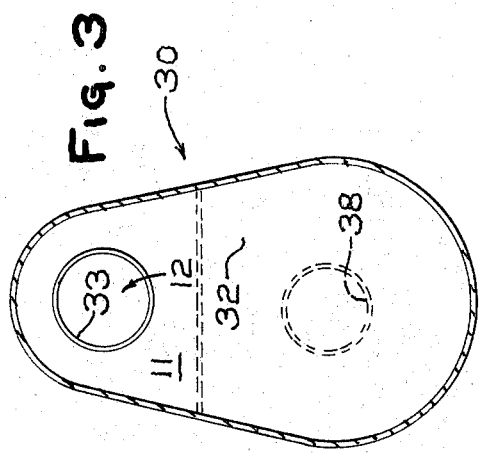

DEVICE FOR AGGLOMERATING AND SEPARATING PARTICULATES FROM A GAS

DESCRIPTION OF THE INVENTION

Concern has been expressed by federal and state governments as well as by the automotive industry in recent years in solving the problems of atmospheric pollution caused by the exhaust gas emissions of internal combustion engines and in particular automotive exhaust gas emissions. These emissions on a volume basis are primarily gases such as oxides of carbon, nitrogen and unburned hydrocarbons. In addition the use of leaded fuel in gasoline contributes lead particulates to automotive exhaust gases which also contain carbon, iron and other metals and hydrocarbon particulates. The presence of these particulates in automotive exhaust gases has become a matter of considerable concern to both the automotive industry and government. Although the use of lead in gasoline has been proven to be beneficial, the particulate lead emissions may represent a health hazard. Accordingly, it would be beneficial if an apparatus could be developed which would reduce and substantially eliminate the lead particulates from internal combustion engine emissions and this application is concerned with such an apparatus.

In accordance with the present invention, an apparatus is provided for conditioning exhaust gas produced by an internal combustion engine, such as an automobile engine, to remove substantially all of the lead particulates as well as other particulates such as iron and carbon. More particularly, said apparatus for conditioning gaseous emissions from an internal combustion engine comprises a housing having a first and second entrance chamber at opposite ends of said housing; gas inlet conduit means connected to said first entrance chamber for conveying gaseous emissions into said first entrance chamber; perforated gas agglomerator conduit means connecting said first and second entrance chambers, said conduit means spaced from the internal walls of said housing; inertial separator means in gas communication with said second entrance chamber; baffle means spaced from the internal walls of said housing and between said perforated gas agglomerator conduit means and said inertial separator means to define an agglomerator chamber and a separator chamber; and gas exit conduit means in gas communication with said inertial separator means. In a preferred embodiment the apparatus is coupled to a filter. Other preferred embodiments include the use of:

an agglomerator aid both within the agglomerator conduit and agglomerator chamber, a cyclone as the inertial separator and particulate collecting means connected to the inertial separator, said collecting means comprising a second perforated conduit and preferably a reentrainment inhibitor in communication with said particulate collecting means to receive particulates through the perforations of said second perforated conduit and to inhibit the return of particulates into the inertial separator.

As used herein in the specification and claims, the following terms have the indicated meanings. The term "particulates" means very small bits of materials and includes lead compounds, carbon, iron and other metals and organic hydrocarbons, which are constituents of exhaust gas from an internal combustion engine, having a particle size from submicron to 50 microns or more. The term "conditioning" means physical treatment to separate particulates from the exhaust gas from submicron size to up to 50 microns or more. The term "internal combustion engine" means any engine in which power is developed by combustion within said engine and includes but is not limited to engines powering automobiles, trucks, earth moving equipment and recreation vehicles that burn fuel such as gasoline, kerosene, diesel fuel and propane. The term "inertial separator" means any device which removes the particulates, e.g., the lead particulates, from the exhaust gas by changing the flow direction of the particle laden exhaust.

BRIEF DESCRIPTION OF THE DRAWINGS

The invention will be more readily understood with reference to the accompanying drawings in which:

FIG. 2 is an enlarged view of a preferred embodiment of the present invention showing the separator of FIG. 1 partially broken away to show the internal configuration;

FIG. 3 is a cross-section of FIG. 2 taken along lines 3—3 to show the internal configuration of the entrance chamber;

FIG. 4 is a cross-section of FIG. 2 taken along lines 4—4 to show the positioning of the agglomeration aid and reentrainment inhibitor;

FIG. 5 is a cross-section of FIG. 2 taken along lines 5—5 to show the entrance to the inertial separator;

DETAILED DESCRIPTION OF THE DRAWINGS AND INVENTION

Figure 1:
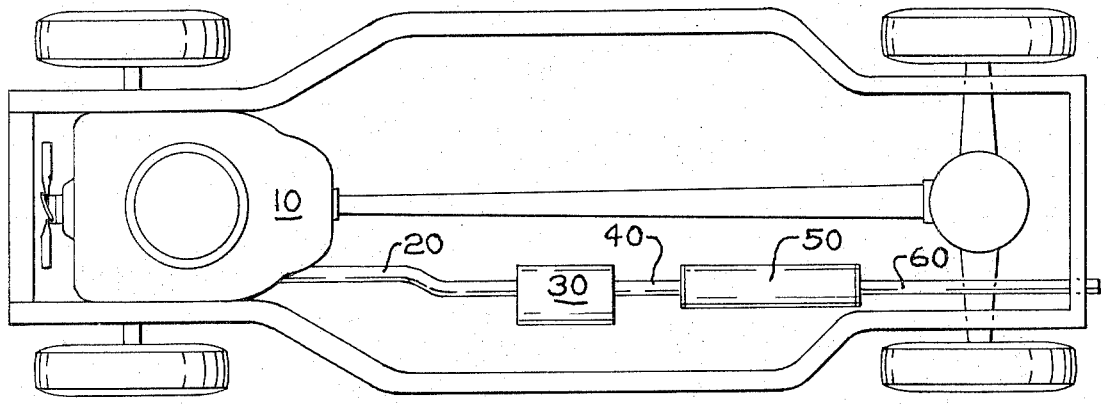
FIG. 1 is a view of the bottom of an automobile showing the agglomerator and inertial separator in a unitary housing, and a filter located in series with the exhaust system.

The invention is more readily understood by referring to the drawings in detail. FIG. 1, the underside of the conventional automobile, is shown having an engine 10 and an exhaust pipe 60 connected in series to agglomerator and inertial separator apparatus 30 and filter 50, via conduits 20 and 40. If desired two or more apparatus can be employed in series and multiple trains can be employed, e.g., dual exhaust systems.

As shown in more detail in FIGS. 2, 3, 4, and 5, the apparatus 30 for conditioning exhaust gas comprises a first perforated agglomerator conduit 33 and an inertial separator, preferably a cyclone, 37. In operation, exhaust gas containing particulate matter is received from conduit 20 via exhaust gas inlet means 31 into a first entrance chamber 32 and transmitted through entrance 12 into perforated agglomerator conduit 33, which preferably contains disposed within said conduit an agglomeration aid. Exhaust gas received via inlet means 31 impinges on a portion of wall 11 which portion is adajcent to collector 38. Heat is thereby transmitted by conduction to prevent collector 38 from becoming clogged when the agglomerator-separator apparatus is employed in cold climates.

The agglomeration aid can be of any heat resistant and corrosion resistant material, which maintains its integrity under the conditions encountered, such as alumina, asbestos, stainless steel wire, glass beads, and fiber glass but is preferably stainless steel wire. By means of the perforations in said conduit 33, gas containing particulates is allowed to pass between said conduit and chamber 34, which contains an agglomeration aid, 14 such as any of the aforementioned. The agglomeration aid, e.g., stainless steel wire, is loosely packed or formed to provide many impingement surfaces for particulates so that they may grow to a size to be easily recoverable in the inertial separator 37.

Figure 6:
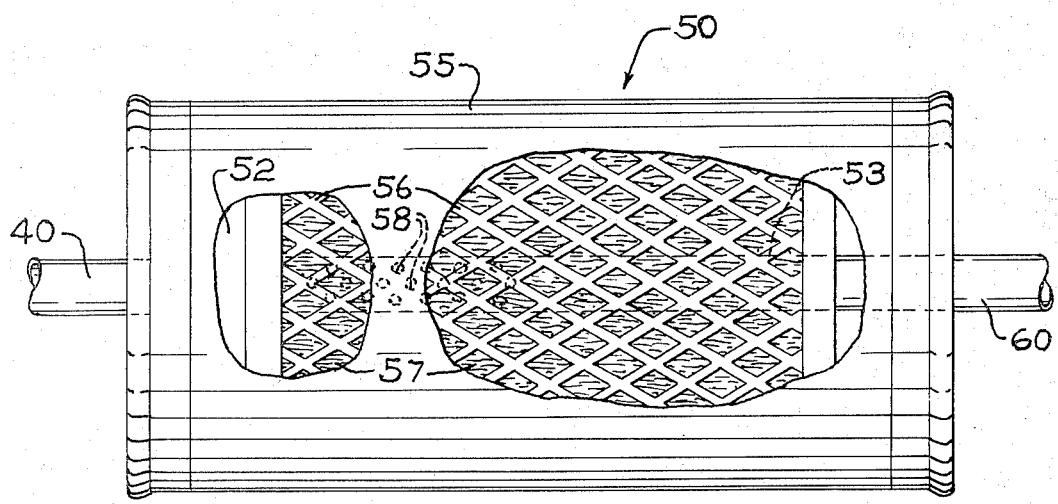
FIG. 6 is a view of a filter partially broken away to show the filtering aid.

From perforated conduit 33, the exhaust gas is transmitted into a second entrance chamber 35 in communication with entrance 36 to inertial separator 37, which, as shown, is a cyclone. The gas spirals down the cyclone chamber throwing the larger particulates, i.e., greater than about 2 microns into a second perforated conduit, collector 38, for transmittance through the perforations into the separator chamber 16 which contains a suitable reentrainment inhibitor 15, such as fiber glass, asbestos, stainless steel wire, alumina or glass beads, to prevent particulates from reentering collector 38 and cyclone 37. The internal wall 13 separating agglomerator chamber 34 and separator chamber 16 is imperforate to prevent communication of particulates between said chambers. Upsweeping gas from cyclone 37 is passed through conduits 39 and 40 to filter 50 which filter is shown in detail in FIG. 6.

Filter 50 is composed of a cylindrical housing 55 having placed therein a screen member 56. The screen 56 contains a fibrous material such as fiber glass mat 57 forming the filter element of this structure. Said screen and mat are sized such that a gas space 52 is provided between the inlet wall of housing 55 and the screen 56 and mat 57 contained therein. A centrally disposed perforated conduit 53 is provided which has a plurality of openings 58 along the long axis of the area of the conduit which is surrounded by the mat 57 and screen 56. The end of conduit 53 is imperforate and is in gas communication with exit tube 60. Housing 55 is so proportioned to be slightly larger than screen 56. Thus, gas entering gas space 52 is passed between housing 55 and screen 56 and then downwardly through mat 57 to the openings 58 in conduit 53. From conduit 53, the gases are passed to exhaust conduit 60.

The placement of the agglomerator and separator device 30 and filter 50 in the automotive system is preferably made in a manner to insure that the temperature of the exhaust gas is in the desired range. Alternatively, fluted conduits, swirl vanes and other conventional devices can be used to reduce the temperature of the exhaust gas. The exhaust gas which the agglomerator separator device encounters should be in the range of 700° to 900° F. The gas temperature of gas entering the filter unit is no more than about 700° F and is preferably between about 500° and 600° F. It has been found that at the 700° to 900° F. range the agglomerator device operates very effectively in producing large particulates of lead in automotive exhaust gas which can be subsequently trapped in the separator or filter. When the filter receives exhaust gas at temperatures of 700° F. or less a substantial portion of all particulate lead is removed from automotive exhaust gases of engines using a leaded fuel.

The filter element 57 employed in the instant invention can be of any high efficiency type, but is preferably formed from a pleated fiber glass paper which has been treated with a protective binder such as a benzophenone dianhydride phenylene diamine. Such a filter, suitable binders, and a method for preparation and application of said binders are all described in U.S. Pat. application Ser. No. 192,848, filed Oct. 27, 1971, in the name of John P. Wisnewski, pages 3 through 7 of which application is herein specifically incorporated by reference. The aforementioned binder is sold by Monsanto Company as Skybond 700. This binder can be prepared for binding fiber glass by forming a bath of water with the binder and ammonium hydroxide. The fiber glass is then formed into the desired shape, dipped in the bath and allowed to air dry. Then the fiber glass is oven cured.

A preferred filter element is composed of convoluted fiber glass paper, which paper is formed by slurrying fiber glass fibers or strands on a conventional paper making machine.

Alumina or glass beads having an irregular shape much like pea gravel are suitable for use in the filter of the invention and are commercially available. Said beads can also be employed as an agglomeration aid or reentrainment inhibitor. High efficiency fiber glass filter paper, asbestos, and stainless steel wire suitable for use in this invention as an agglomeration aid, reentrainment inhibitor or filtering aid are available from a number of suppliers.

When a fibrous material such as fiber glass, stainless steel wire, or asbestos is used in the agglomerator, separator, or filter, the fibers can have a diameter of from about 0.5 micron to 0.05 inch and can be compacted to form a coarse mesh having a density of between about 5 to about 24 pounds per cubic foot. Fibrous material employed in the filter should have a diameter near the lower end of the aforesaid range such as between about 0.5 and about 20 microns. Alumina or glass beads can be densely packed.

When fiber glass is employed as the agglomeration aid, reentrainment inhibitor or filter aid, a binder is preferably affixed to the fiber glass to ensure its thermal stability at the high temperatures encountered. Preferred binders are colloidal silicas such as Positive Sol 130 M and Ludox HS-40 which are preferably employed in combination with a mineral flocculent all available from Dupont Company. The fiber glass is preferably first dipped in the colloidal silica and immediately thereafter dipped in the mineral flocculent and allowed to air dry. It is preferred that fiber glass not be employed as an agglomeration aid because the high temperatures encountered in the agglomerator cause rapid degradation of the fiber glass and may decompose any binder affixed thereto.

The size of the perforations in the agglomerator conduit and separator collector is not a critical feature of the invention. For best results, however, the diameter of the perforations should be at least about 0.12 inch. If desired, slots can be employed in lieu of circular perforations.

The agglomerator, separator and the apparatus housing as well as the filter housing and connector conduits can be made of conventional metal materials such as steel but is preferably a corrosion resistant metal such as stainless steel.

In addition to the preferred cyclone separator, other inertial separators may be employed in the invention such as baffle chambers, centrifugal separators in which the centrifugal force comes not from the motion of the gas alone, but wherein the gas rotation is obtained by means of a fan; and impingement separators can be employed which depend on the inertial deposition of particulates as the gas passes through an obstruction.

In a specific embodiment, an agglomerator-separator device and filter of the invention were employed on a 1972 Chrysler test car. Stainless steel wire was loosely packed in the separator and agglomerator chambers. The filter contained high efficiency convoluted after fiber glass filters as described in U.S. Pat. application Ser. No. 192,848 incorporated by reference (supra). The car had a V-8 engine and was operated on regular leaded gasoline and was driven for a total of 50,000 miles on a highway course that involved urban, suburban and freeway conditions. It was found that the system removed substantially all of the lead, carbon and iron from the exhaust gas and that the exhaust particulates emitted to the air through the system ranged from between 0.01 gram per mile (gpm) and 0.04 gpm, with the higher levels developing after the 40,000 mile mark. Based on the average lead content of the gasoline utilized during the test period and the total quantity of lead collected in the separator chamber and filter, it was estimated that substantially all of the lead in the gasoline was recovered.

Thus, while the invention has been described with reference to certain specific illustrated embodiments, this is not to be construed as limiting the invention except insofar as appears in the accompanying claims.

We claim:

1. An apparatus for conditioning gaseous emissions from the internal combustion engine, said apparatus comprising:
   a. a housing having a first and second entrance chamber at opposite ends of said housing;
   b. gas inlet conduit means connected to said first entrance chamber for conveying gaseous emissions into said first entrance chamber;
   c. perforated gas agglomerator conduit means connecting said first and second entrance chambers, said conduit means being spaced from the internal walls of said housing;
   d. inertial separator means in gas communication with said second entrance chamber;
   e. baffle means spaced from the internal walls of said housing and between said perforated gas agglomerator conduit means and said inertial separator means to define an agglomerator chamber and a separator chamber; and
   f. gas exit conduit means in gas communication with said inertial separator means.

2. The apparatus of claim 1 wherein an agglomeration aid is contained in said agglomerator chamber.

3. The apparatus of claim 2 wherein an agglomeration aid of stainless steel wire is formed about the perforated agglomerator conduit.

4. The apparatus of claim 1 wherein the inertial separator means is a cyclone.

5. The apparatus of claim 1 wherein said separator chamber contains a reentrainment inhibitor of fiber glass.

6. The apparatus of claim 1 additionally comprising a filter and conduit means for transmitting gas from said separator to said filter and conduit means for transmitting gas from said filter to the atmosphere.

7. The apparatus of claim 6 wherein the filter comprises a high efficiency fiber glass filtering aid disposed about a perforated conduit contained in a housing said fiber glass having a colloidal silica binder and a mineral flocculent affixed thereto, and means to pass gas through the conduit and filtering aid and means to remove gas through the filter after passage through the filtering aid.

8. The apparatus of claim 1 additionally comprising an agglomeration aid disposed within said perforated agglomerator conduit.

9. An apparatus for conditioning gaseous emissions produced by an internal combustion engine, said apparatus comprising:
   a housing having a first and second entrance chamber at opposite ends of said housing;
   gas inlet conduit means connected to said first entrance chamber for conveying gaseous emissions into said first entrance chamber;
   perforated gas agglomerator conduit means connecting said first and second entrance chambers, said agglomerator conduit means being spaced from the internal walls of said housing;
   an agglomeration aid of stainless steel wire formed about said agglomerator conduit means;
   a cyclone separator in said housing in gas communication with said second entrance chamber;
   particulate collecting means connected to said separator, said collecting means comprising a second perforated conduit in communication with a reentrainment inhibitor to receive particulates through the perforations of said second perforated conduit, and to inhibit the return of said particulates into the cyclone separator; and
   gas exit conduit means in communication with said cyclone separator.

10. The apparatus of claim 9 additionally comprising a baffle means spaced from the internal walls of said housing and between said perforated gas agglomerator means and said cyclone separator to define an agglomerator chamber and a separator chamber.

11. The apparatus of claim 9 additionally comprising an agglomeration aid disposed within said perforated agglomerator conduit.

12. The apparatus of claim 9 wherein the reentrainment inhibitor comprises fiber glass.

* * * * *